United States Patent
Cho et al.

[19]

[11] Patent Number: 5,940,749
[45] Date of Patent: Aug. 17, 1999

[54] APPARATUS FOR ELIMINATING EXTERNAL INTERFERENCE SIGNALS IN CODE DIVISION MULTIPLE ACCESS MOBILE PHONE AND METHOD THEREFOR

[75] Inventors: Sun Cho, Suwon; Hee-Deog Kim, Seoul, both of Rep. of Korea

[73] Assignee: Samsung Electronics Co., Ltd., Rep. of Korea

[21] Appl. No.: 08/870,087

[22] Filed: Jun. 5, 1997

[30] Foreign Application Priority Data

Oct. 29, 1996 [KR] Rep. of Korea ...................... 96-49743
May 16, 1997 [KR] Rep. of Korea ...................... 97-18905

[51] Int. Cl.$^6$ .................................................. H04B 1/06
[52] U.S. Cl. .................................. 455/249.1; 455/234.1; 455/296; 455/226.2; 375/345; 370/342; 330/129
[58] Field of Search ...................... 455/296, 295, 455/226.1, 226.2, 226.3, 232.1, 234.1, 234.2, 243.1, 249.1, 250.1, 308, 283, 311, 67.1, 67.3, 63; 370/252, 320, 335, 342, 441; 375/205, 206, 208, 209, 210, 345, 346; 330/278–279, 129

[56] References Cited

U.S. PATENT DOCUMENTS

| | | | |
|---|---|---|---|
| 4,742,565 | 5/1988 | Iwahashi | 455/234.2 |
| 5,184,349 | 2/1993 | Riordan | 455/250.1 |
| 5,490,179 | 2/1996 | Ong | 375/345 |
| 5,564,094 | 10/1996 | Anderson et al. | 455/295 |
| 5,758,271 | 5/1998 | Rich et al. | 455/226.2 |

*Primary Examiner*—Doris H. To
*Attorney, Agent, or Firm*—Dilworh & Barrese

[57] ABSTRACT

A method for minimizing or eliminating external interference signals in a CDMA mobile phone uses a memory for storing a plurality of predetermined control voltage values, received signal strength indicator (RSSI) data classified into various grades for each of the control voltage values, reference value data classified into various grades for each RSSI to meet a given signal receiving condition and control voltage change data corresponding to the reference value data. The method includes the steps of setting an initial control voltage to control a damping device, receiving a communication signal, finding one of the RSSI data grades where the RSSI of the received signal belongs, finding one of the reference value data grades where the received signal belongs, and evaluating the difference between the normal signal and external interference signals based on the control voltage, RSSI grade and reference value data grade. The control voltage generator is controlled to reset the control voltage according to the difference.

10 Claims, 7 Drawing Sheets

APPARATUS FOR ELIMINATING EXTERNAL INTERFERENCE SIGNALS IN CODE DIVISION MULTIPLE ACCESS MOBILE PHONE AND METHOD THEREFOR

BACKGROUND OF THE INVENTION

1. Field of the Invention

The present invention relates to a code division multiple access (CDMA) mobile phone in a digital communication system, and more particularly a circuit for minimizing or eliminating external interference signals in such a mobile phone.

2. Description of the Related Art

Generally, mobile phone or cellular communication systems employ multiple access communication techniques such as CDMA or Advanced Mobile Phone Service (AMPS). Typically, digital systems employ CDMA and frequency modulation is used in AMPS. CDMA may be used in dual mode to allow reception of an analog signal. Namely, it may be used not only in CDMA mode but also in AMPS mode. In such usage, when digital signals are communicated, there often occur analog interfering signals to cut a call signal or cause erroneous reception of the digital signals. This error is called intermodulation distortion (IMD), which affects a CDMA mobile phone near an AMPS radio station. A strong external interference signal overloads the low noise amplifier of the CDMA phone so that the IMD component severely interferes with the CDMA frequency band, causing it to be off-line. Following is a specific description of the influence of such interference signals.

The received interference signals pass through the low noise amplifier to produce second and third order harmonics Eo, which may be expressed by Eq. 1.

$$Eo = k_1 Ei + k_2 Ei^2 + k_3 Ei^3 \qquad \text{[Equation 1]}$$

If there are generated dual tones with the same amplitude and different frequencies, the dual tones are expressed by Eq. 2.

$$Ei = A(\cos\omega_1 t + \cos\omega_2 t) \qquad \text{[Equation 2]}$$

Substituting Ei of equation 2 in equation 1:

$$\begin{aligned}Eo = {} & k_1 A(\cos\omega_1 t + \cos\omega_2 t) + \\ & k_2 A^2(\cos\omega_1 t + \cos\omega_2 t)^2 + k_3 A^3(\cos\omega_1 t + \cos\omega_2 t)^3 = \\ & k_2 A^2 + k_2 A^2(\omega_1 - \omega_2)t + (k_1 A + 9k_3 A^3/4)\cos\omega_1 t + \\ & (k_1 A + 9k_3 A^3/4)\cos\omega_2 t + 3k_3 A^3/4\cos(2\omega_1 - \omega_2)t + \\ & 3k_3 A^3/4\cos(2\omega_2 - \omega_1)t + k_2 A^2 \cos(\omega_1 + \omega_2)t + \\ & k_2 A^2/2\cos 2\omega_1 t + k_2 A^2/2\cos 2\omega_2 t + \\ & 3k_3 A^3/4\cos(2\omega_1 + \omega_2)t + 3k_3 A^3/4\cos(2\omega_2 - \omega_1)t + \\ & k_3 A^3/4\cos 3\omega_1 t + k_3 A^3/4\cos 3\omega_2 t\end{aligned} \quad \text{[Equation 3]}$$

As expressed by Eq. 3, two signals with different frequencies F1 and F2 are amplified to generate non-linear components in the form of the products obtained by multiplying the mixed forms of the second and third orders. The second order mixing is 2F1, 2F2, F1+F2 and F1−F2. Such signals of the mixed component occur outside the narrow band of most systems, and therefore are negligible. The third order mixing is 2F1+F2, 2F1−F2, 2F2−F1 and 2F2+F1, whose signals are IMDs occurring in the pass band of most systems.

SUMMARY OF THE INVENTION

It is an object of the present invention to provide an apparatus for minimizing or eliminating external interference signals generated from AMPS stations in a CDMA mobile phone to prevent communication errors such as cutting of a call within the area affected by the AMPS station, and method therefor.

According to the present invention, a device and a method are disclosed for eliminating or minimizing external interference signals in a CDMA mobile phone. The device includes a low noise amplifier connected to damping device and a memory for storing information representing a plurality of predetermined control voltage values, received signal strength indicator (RSSI) data classified into various grades for each of the control voltage values, reference value data classified into various grades for each RSSI to meet a given signal receiving condition and control voltage change data corresponding to the reference value data. The method comprises the steps of setting an initial control voltage to control the damping device, receiving a communication signal, finding one of the RSSI data grades where the RSSI of the received signal belongs, finding one of the reference value data grades where the received signal belongs, and evaluating the difference between the received signal and external interference signals based on the control voltage, RSSI grade and reference value data grade. The control voltage generator is controlled to adjust the control voltage according to the difference.

In one aspect of the present invention, the reference value data may be mean transmission energy rate per chip or frame error rate (FER) data according to the second service option in the forward communication channel.

The present invention will now be described more specifically with reference to the drawings attached only by way of example.

DETAILED DESCRIPTION OF THE PREFERRED EMBODIMENT

In the attached drawings, same reference numerals are used to represent parts serving same functions and detailed descriptions for parts not essential to describe the inventive concept are omitted.

In the first illustrative embodiment of the invention, two factors are considered to detect IMD signals. The first is RSSI and the second is the pilot channel, sink channel, paging channel and mean transmission energy rate per PN chip (hereinafter referred to as Ec/Io). The RSSI is to consider natural losses of the signal power during transmission from the transmitter to the receiver. The natural losses are path loss or free space attenuation, absorption, fading free space attenuation, atmospheric absorption, etc.

In the second illustrative embodiment of the invention, the two factors used to detect IMD signals are the RSSI and the FER. The service option is the standard for the loop-back service option of a terminal. FER is represented by percentage %, calculated in "1-(properly received frames/all received frames)". The following equations 4 to 9 are expressions for the signal power transmitted from the transmitter to the receiver, and provide the RSSI and Ec/Io or FER to eliminate the external interference signals from an AMPS station. The power density of a receiving antenna may be expressed by Eq. 4.

$$Pr = Pt/(4\pi d^2) \quad \text{[Equation 4]}$$

Wherein "Pt" represents the level of a signal generated by the transmitter, and "d" the distance between the transmitter and the receiver. The power PAr received by the receiving antenna may be expressed by Eq. 5.

$$PAr = Pr \times Aea \quad \text{[Equation 5]}$$

Wherein Aea represents effective area and varies in proportion to the antenna gain and $\lambda/4\pi$. The antenna gain G may be expressed by Eq. 6.

$$G = \eta(4\pi/\lambda^2)Aea \quad \text{[Equation 6]}$$

Wherein $\eta$ represents efficiency, and the power PAr received by the receiving antenna may be expressed by Eq. 7.

$$PAr = (Pt/(4\pi d^2)) \times (c^2/4\pi f^2) = (c/4\pi fd) \times Pt \quad \text{[Equation 7]}$$

Wherein Aea/G is $c^2/4\pi f^2$, the unit of "d" is kilometer, and the unit of "f" megahertz, and the gain of a signal transmitted from the transmitter to the receiver may be expressed by Eq. 8.

$$PAr/Pt = (c/4\pi)^2 (1/d^2)(1/f^2) \quad \text{[Equation 8]}$$

The free space loss may be expressed in decibels by Eq. 9.

$$L(dB) = 32.44 + 20 \log(d_{km}) + 20 \log(f_{MHz}) \quad \text{[Equation 9]}$$

Figure 1:
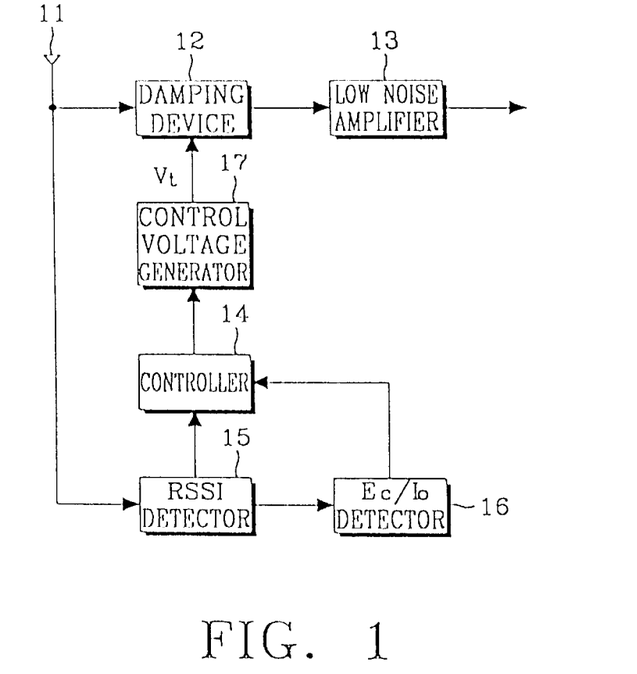
FIG. 1 is a block diagram for illustrating a partial structure of a CDMA mobile phone according to a first embodiment of the present invention.

Referring to FIG. 1, the CDMA phone comprises an antenna 11 for receiving a CDMA signal, a damping device 12 for attenuating the received signal to a given level, low noise amplifier 13 for amplifying the received signal to a prescribed level with reducing noises, control voltage generator 17 for generating a control voltage Vt to control the damping device 12, RSSI detector 15 for detecting the RSSI of the received signal, Ec/Io detector 16 for detecting the Ec/Io from the RSSI detector 15, and controller 14 for controlling the control voltage generator 17 to generate the control voltage determined according to the RSSI and Ec/Io.

Figure 2:
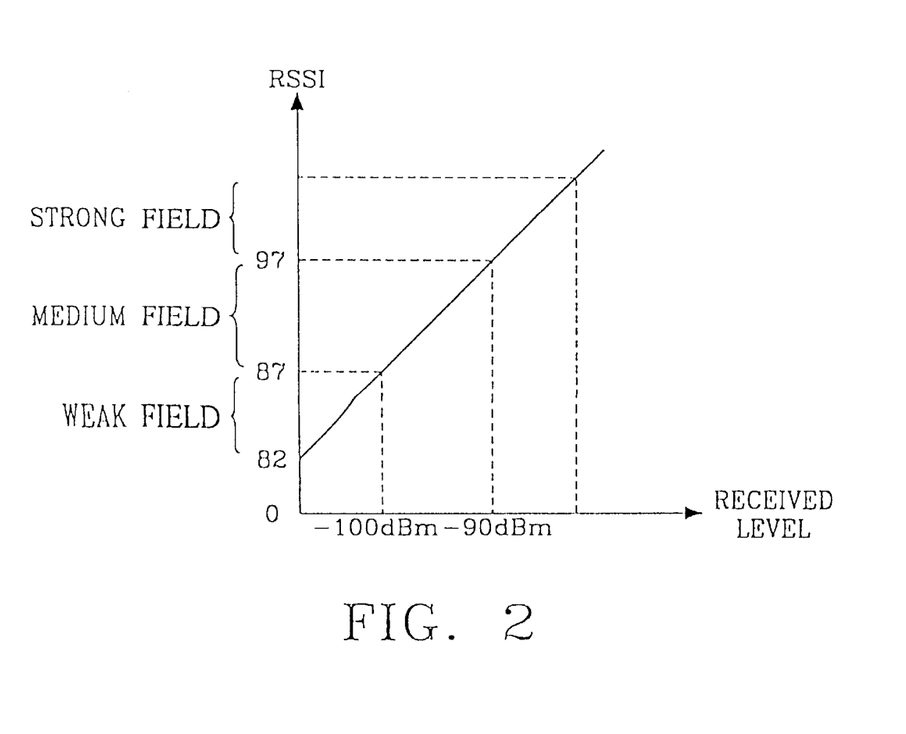
FIG. 2 is a graph for illustrating the RSSI of a received signal versus decibel.

The RSSI is divided into weak, medium and strong level, as shown in FIG. 2. The weak level is 82 to 86 with a received level of 0 to −100 dBm, which represents the total received signal to be weak. The medium level is 87 to 96 with a received level of −100 dBm to −90 dBm, which represents the total received signal to be medium. The strong level is over 97 with a received level of over −90 d/dBm, which represents the total received signal to be strong enough to enable communication without error. Accordingly, the received level is in proportion to the RSSI so that the RSSI increases with the level of a CDMA signal received through the antenna 11.

Figure 3:
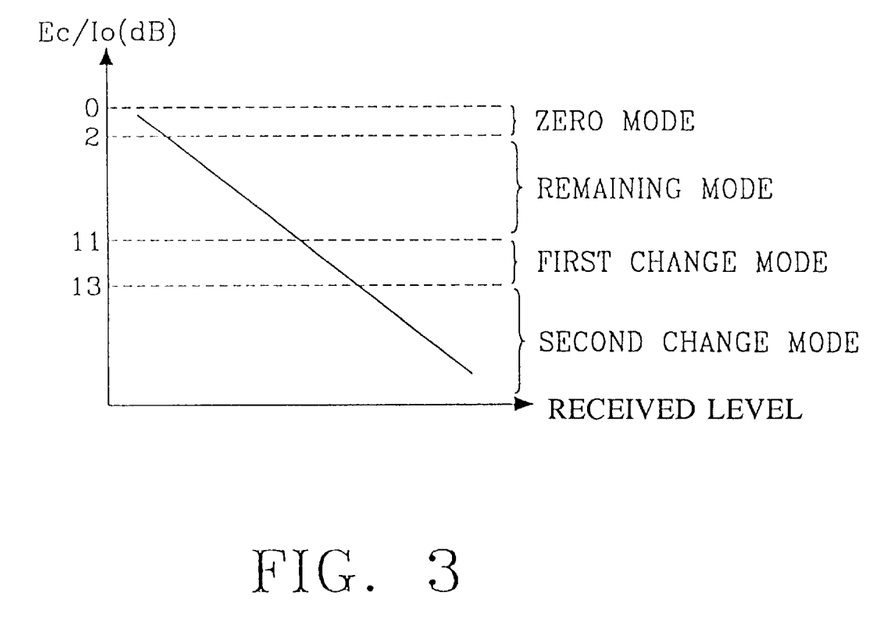
FIG. 3 is a graph for illustrating Ec/Io versus the received level of a signal.

As shown in FIG. 3, Ec/Io is divided into zero, remaining, first change and second change modes. When Ec/Io is in the range of 0–1, the mean transmission energy rate per PN chip is at a maximum. When Ec/Io is in the range of 2–10, the mean transmission energy rate per PN chip is at medium level, representing remaining mode without any control. When Ec/Io is in the range of 11–12, the mean transmission energy rate per PN chip has a low value, representing the first change mode to need a controlled increase of the rate. Being essentially the same with the first change mode, the second change mode represents Ec/Io to exceed 13, which means an increase of the instantaneous speed by doubling the control condition. Accordingly, the received level is inversely proportional to Ec/Io.

Figure 4:
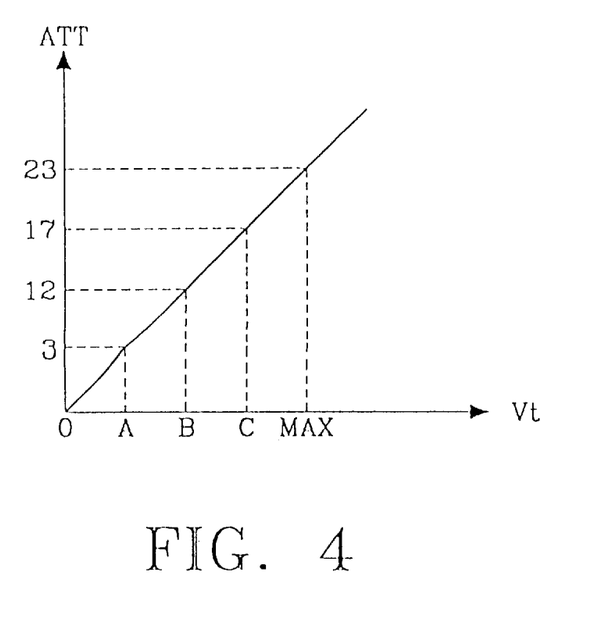
FIG. 4 is a graph for illustrating attenuation versus control voltage.

Referring to FIG. 4, there is no attention when the control voltage Vt is zero. The damping device control signal is divided in N equal values according to the characteristics of the damping device 12 in order to effectively attenuate all the signals received by the antenna 11. The external interference signals cause the RSSI to increase and thus Ec/Io also. Hence, decreasing of the RSSI means corresponding decrease of the external interference signals or the original signal. Table 1 shows control voltages Vt.

TABLE 1

| Control Vt (V) | Class | Code Value |
| --- | --- | --- |
| 0 | 0 | 000 |
| 1.23 | A | 101 |
| 1.64 | B | 132 |
| 2.23 | C | 183 |
| 3.1 | MAX | 250 |

In this case, the control voltage Vt represents average value. According to Table 1, the relation between the RSSI and the Ec/Io varies with Vt, which is illustrated in Table 2. The values of Table 2 may be stored into a memory associated with controller 14. The memory may be externally or internally mounted in controller 14.

TABLE 2

| Vt | RSSI | Ec/Io | Voltage Set Mode |
| --- | --- | --- | --- |
| 0 | Weak | 0–2 | Remaining |
|  |  | 3–10 | Remaining |
|  |  | 11–12 | Remaining |
|  |  | 13- | Remaining |
|  | Medium | 0–2 | Remaining |
|  |  | 3–10 | Remaining |
|  |  | 11–12 | A |
|  |  | 13- | A |
|  | Strong | 0–2 | Remaining |
|  |  | 3–10 | Remaining |
|  |  | 11–12 | A |
|  |  | 13- | B |
| A | Weak | 0–2 | 0 |
|  |  | 3–10 | Remaining |
|  |  | 11–12 | 0 |
|  |  | 13- | 0 |
|  | Medium | 0–2 | 0 |
|  |  | 3–10 | Remaining |
|  |  | 11–12 | B |
|  |  | 13- | C |

TABLE 2-continued

| Vt  | RSSI   | Ec/Io | Voltage Set Mode |
|-----|--------|-------|------------------|
|     | Strong | 0–2   | 0                |
|     |        | 3–10  | Remaining        |
|     |        | 11–12 | B                |
|     |        | 13-   | C                |
| B   | Weak   | 0–2   | 0                |
|     |        | 3–10  | Remaining        |
|     |        | 11–12 | A                |
|     |        | 13-   | 0                |
|     | Medium | 0–2   | 0                |
|     |        | 3–10  | Remaining        |
|     |        | 11–12 | C                |
|     |        | 13-   | C                |
|     | Strong | 0–2   | 0                |
|     |        | 3–10  | Remaining        |
|     |        | 11–12 | C                |
|     |        | 13-   | C                |
| C   | Weak   | 0–2   | 0                |
|     |        | 3–10  | Remaining        |
|     |        | 11–12 | B                |
|     |        | 13-   | 0                |
|     | Medium | 0–2   | 0                |
|     |        | 3–10  | Remaining        |
|     |        | 11–12 | MAX              |
|     |        | 13-   | MAX              |
|     | Strong | 0–2   | A                |
|     |        | 3–10  | Remaining        |
|     |        | 11–12 | MAX              |
|     |        | 13-   | MAX              |
| MAX | Weak   | 0–2   | A                |
|     |        | 3–10  | Remaining        |
|     |        | 11–12 | C                |
|     |        | 13-   | B                |
|     | Medium | 0–2   | A                |
|     |        | 3–10  | Remaining        |
|     |        | 11–12 | C                |
|     |        | 13-   | B                |
|     | Strong | 0–2   | B                |
|     |        | 3–10  | Remaining        |
|     |        | 11–12 | Remaining        |
|     |        | 13-   | Remaining        |

Referring to FIG. 4 and Table 2, when the control voltage Vt is changed from B state with strong RSSI and Ec/Io of 10–11 to C state, the attenuation level should be raised. In this case, since the level of the original signal is low and RSSI is high, it is interpreted that external interferences exist and therefore, the control voltage is changed to C state to increase the attenuation. The time and level for such controlling may be suitably set through field test. Preferably, when Ec/Io is in changing mode, the change is made only after detecting three times and a RSSI bar reflects the differences of the ideal and the voltage control to eliminate the external interference, that is, the offset value is added to or subtracted from the RSSI bar for each control voltage. The same offset value should be applied to the transmission open loop power control.

Figure 5A:
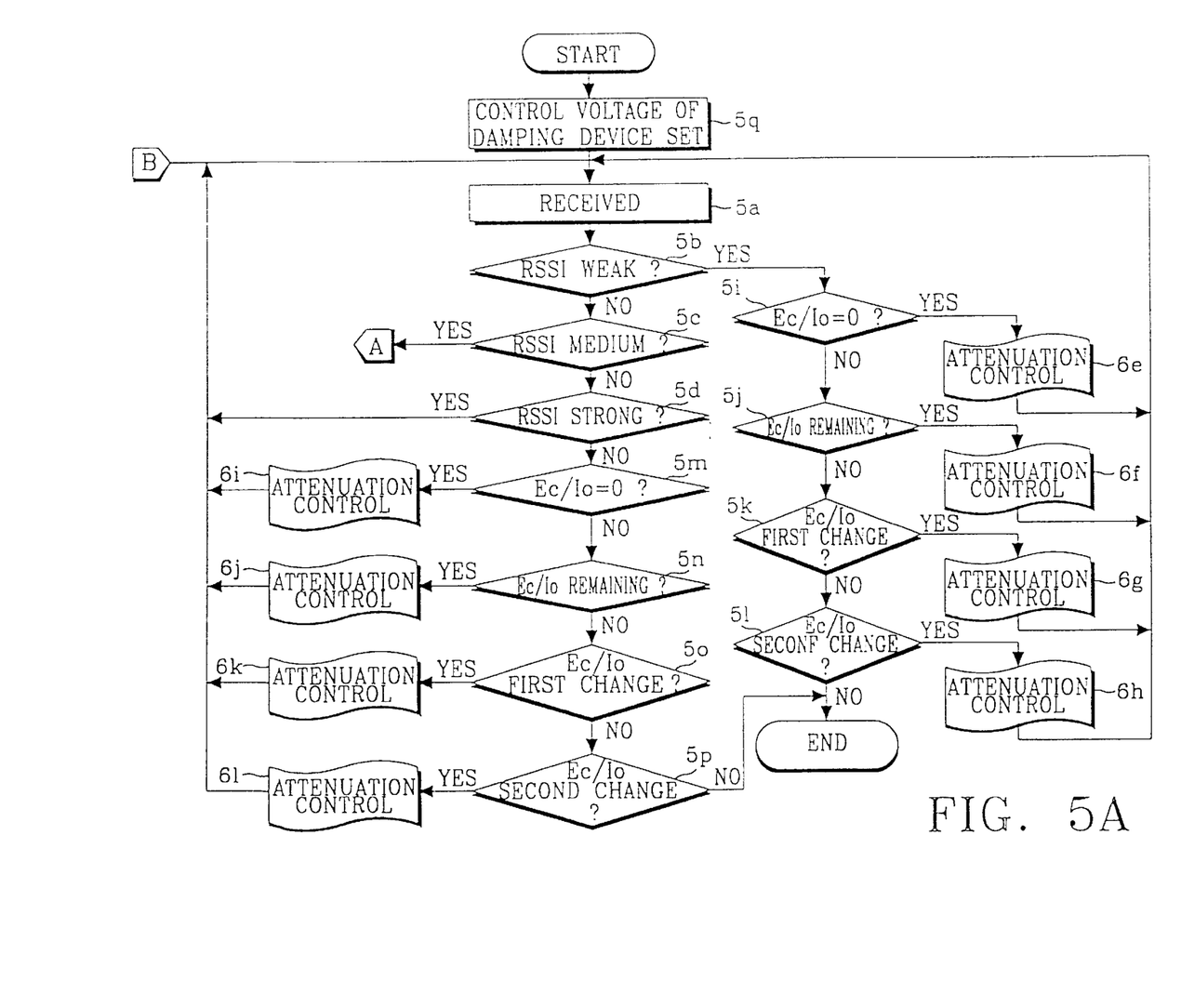
FIGS. 5A and 5B illustrate a flow chart for eliminating external interference signals according to the first embodiment of the present invention.
Figure 5B:
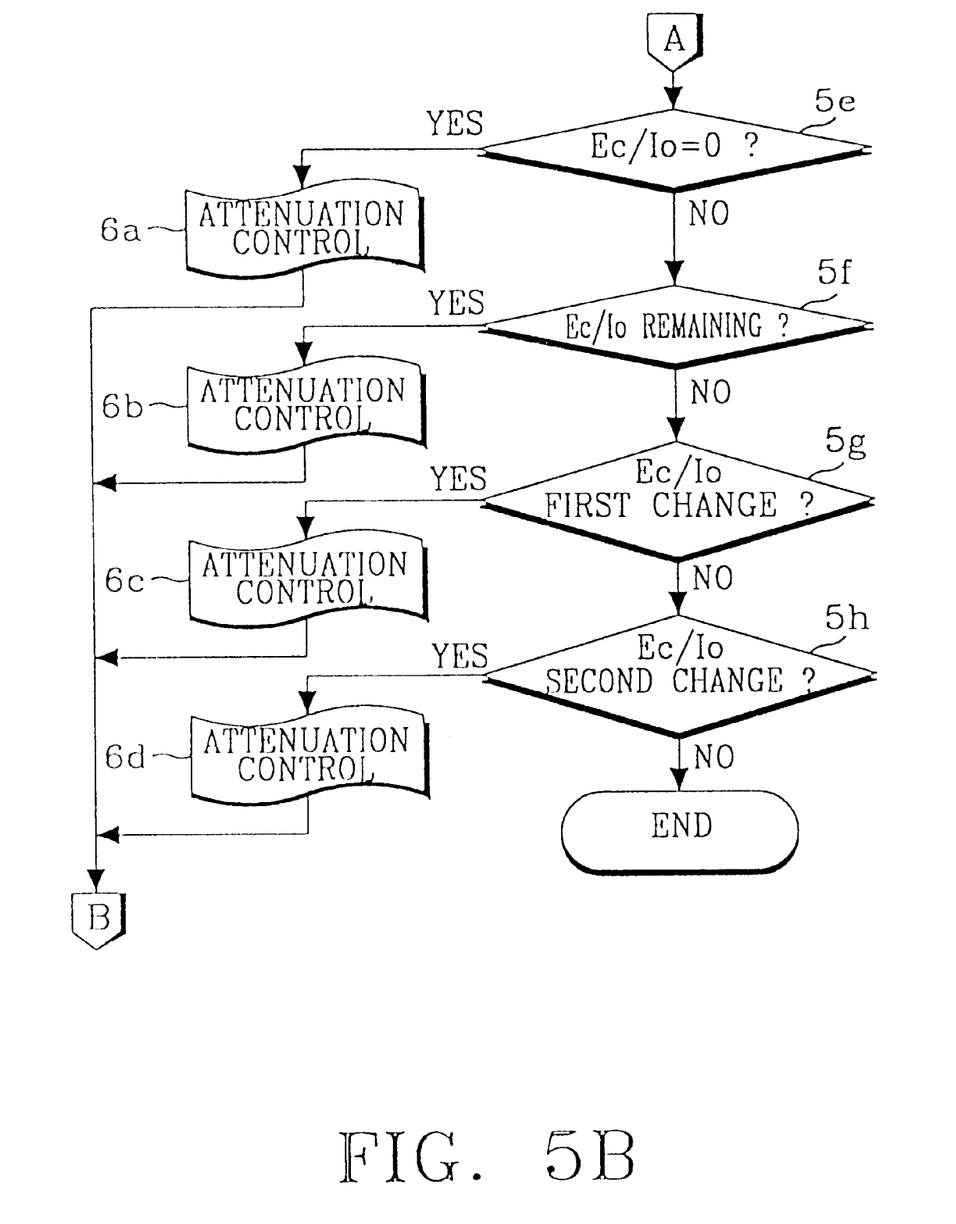

FIGS. 5A and 5B describe a process for eliminating the external interference signals according to the first illustrative embodiment of the present invention. In step 5q, the controller 14 sets the damping device control voltage through control voltage generator 17. Detecting a signal received by the antenna 11 in step 5a, it is checked to which one of the RSSI grades-weak, medium and strong-the received signal belongs in steps 5b–5d. If the RSSI grade is weak, the steps of 5i–5l are carried out. If the RSSI grade is medium, the steps of 5e–5h are carried out as shown in FIG. 5B. If the RSSI is strong, the process is returned to step 5a for processing the next received signal because it does not need the attenuation control.

The steps 5i–5l are to check to which one of the Ec/Io grades the received signal belongs, e. g. zero, remaining, first change and second change. In steps 6e–6h, the difference between the original signal and the external interference signals is detected based on the damping device control voltage, RSSI and Ec/Io. The damping control voltage is set by performing the attenuation control according to the difference. Thereafter, it is returned to step 5a for processing the next received signal. The steps 5e–5h and 6a–6d as shown in FIG. 5B are executed in the same way.

If the RSSI is not determined to belong to any one of the three grades, it is checked through the steps of 5m–5p to which one of the Ec/Io grades the signal received by the antenna 11 belongs as previously described. The difference between the original signal and the external interference signals is detected based on the damping device control voltage and Ec/Io, so that the damping control voltage is set by performing the attenuation control according to the difference. Thereafter, it is returned to step 5a for processing the next received signal.

Figure 6:
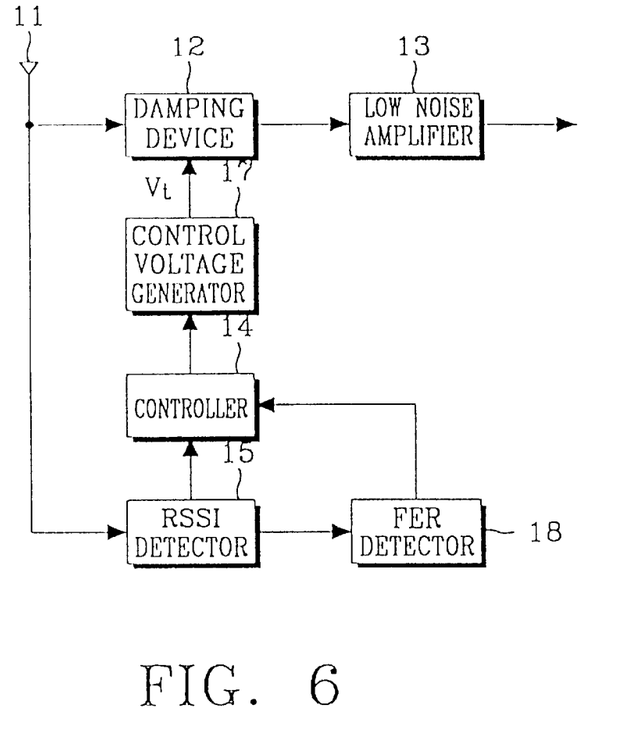
FIG. 6 is a block diagram for illustrating a partial structure of a CDMA mobile phone according to a second embodiment of the present invention.

Referring to FIG. 6, the illustrative second embodiment according to the present invention, the CDMA phone includes an FER detector 18 instead of the Ec/Io detector as shown in FIG. 1. The FER detector 18 detects FER from the RSSI, and the controller 14 controls the control voltage generator 17 to generate the control voltage determined according to the RSSI and FER.

Figure 7:
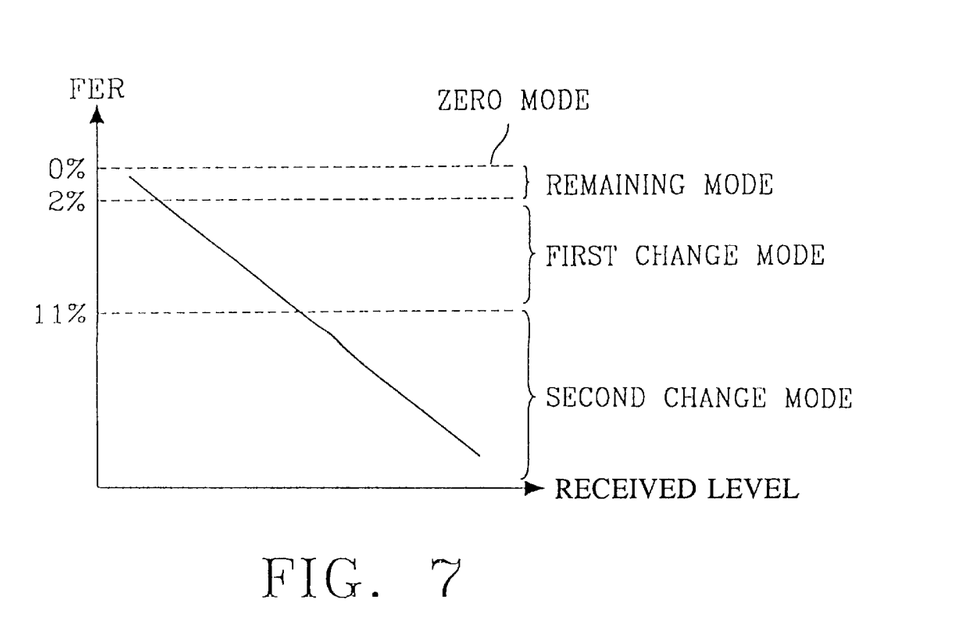
FIG. 7 is a graph for illustrating FER versus the received level of a signal.

Referring to FIG. 7, the FER is divided into zero, remaining, first change and second change modes. When the FER is 0%, the transmitted frame is received with best quality. When the FER is 0–2%, the transmitted frame is received with medium quality, representing remaining mode without any control. When the FER is 2–10%, the transmitted frame is received with low quality, representing the first change mode to need a controlled increase of the rate. Being essentially the same with the first change mode, the second change mode represents the FER to exceed 10%, which means an increase of the instantaneous speed by doubling the control condition. In conclusion, the received level is inversely proportional to FER.

As shown in the previous embodiment employing Ec/Io, the RSSI and FER increase with the external interference signals. According to Table 1, the relation between the RSSI and the FER varies with Vt, which is illustrated in Table 3.

TABLE 3

| Vt | RSSI   | FER (%) | Voltage Set Mode |
|----|--------|---------|------------------|
| 0  | Weak   | 0       | Remaining        |
|    |        | 0–2     | Remaining        |
|    |        | 2–10    | Remaining        |
|    |        | 10-     | Remaining        |
|    | Medium | 0       | Remaining        |
|    |        | 0–2     | Remaining        |
|    |        | 2–10    | A                |
|    |        | 10-     | A                |
|    | Strong | 0       | Remaining        |
|    |        | 0–2     | Remaining        |
|    |        | 2–10    | A                |
|    |        | 10-     | B                |
| A  | Weak   | 0       | 0                |
|    |        | 0–2     | Remaining        |
|    |        | 2–10    | 0                |
|    |        | 10-     | 0                |
|    | Medium | 0       | 0                |
|    |        | 0–2     | Remaining        |
|    |        | 2–10    | B                |
|    |        | 10-     | C                |
|    | Strong | 0       | 0                |
|    |        | 0–2     | Remaining        |
|    |        | 2–10    | B                |

TABLE 3-continued

| Vt | RSSI | FER (%) | Voltage Set Mode |
|---|---|---|---|
| B | Weak | 10- | C |
|  |  | 0 | 0 |
|  |  | 0–2 | Remaining |
|  |  | 2–10 | A |
|  | Medium | 10- | 0 |
|  |  | 0 | 0 |
|  |  | 0–2 | Remaining |
|  |  | 2–10 | C |
|  | Strong | 10- | C |
|  |  | 0 | 0 |
|  |  | 0–2 | Remaining |
|  |  | 2–10 | C |
| C | Weak | 10- | C |
|  |  | 0 | 0 |
|  |  | 0–2 | Remaining |
|  |  | 2–10 | B |
|  | Medium | 10- | 0 |
|  |  | 0 | 0 |
|  |  | 0–2 | Remaining |
|  |  | 2–10 | MAX |
|  | Strong | 10– | MAX |
|  |  | 0 | A |
|  |  | 0–2 | Remaining |
|  |  | 2–10 | MAX |
| MAX | Weak | 10- | MAX |
|  |  | 0 | A |
|  |  | 0–2 | Remaining |
|  |  | 2–10 | C |
|  | Medium | 10- | B |
|  |  | 0 | A |
|  |  | 0–2 | Remaining |
|  |  | 2–10 | C |
|  | Strong | 10- | B |
|  |  | 0 | B |
|  |  | 0–2 | Remaining |
|  |  | 2–10 | Remaining |
|  |  | 10- | Remaining |

Referring to FIG. 4 and Table 3, when the control voltage Vt is changed from B state to C state with strong RSSI and FER of 2–10%, the attenuation level should be raised. Namely, since the level of the original signal is low with high RSSI, it is interpreted that external interference signals exist and therefore, the control voltage is changed to C state to increase the attenuation.

Figure 8A:
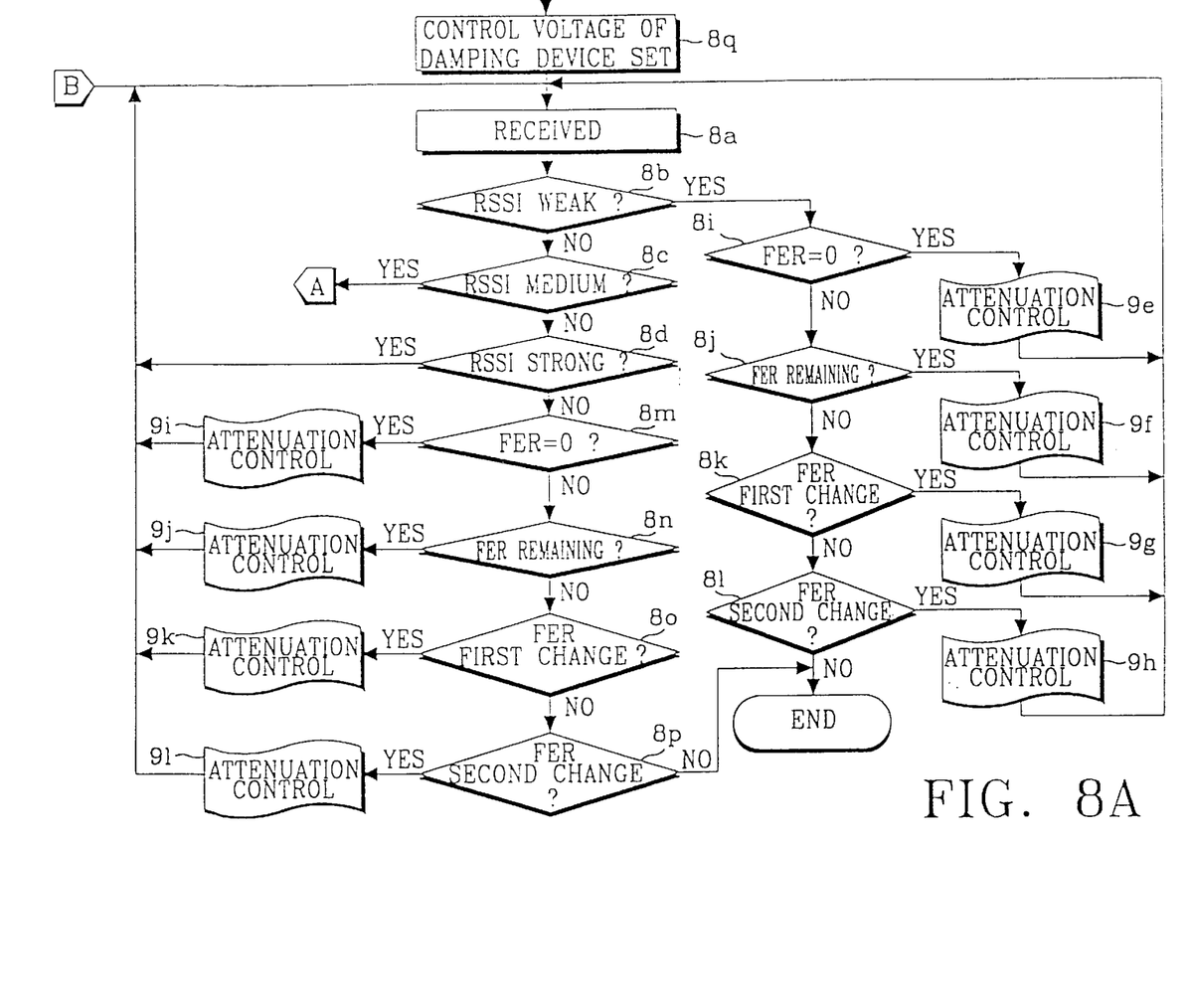
FIGS. 8A and 8B illustrate a flow chart for eliminating external interference signals according to the second embodiment of the present invention.
Figure 8B:
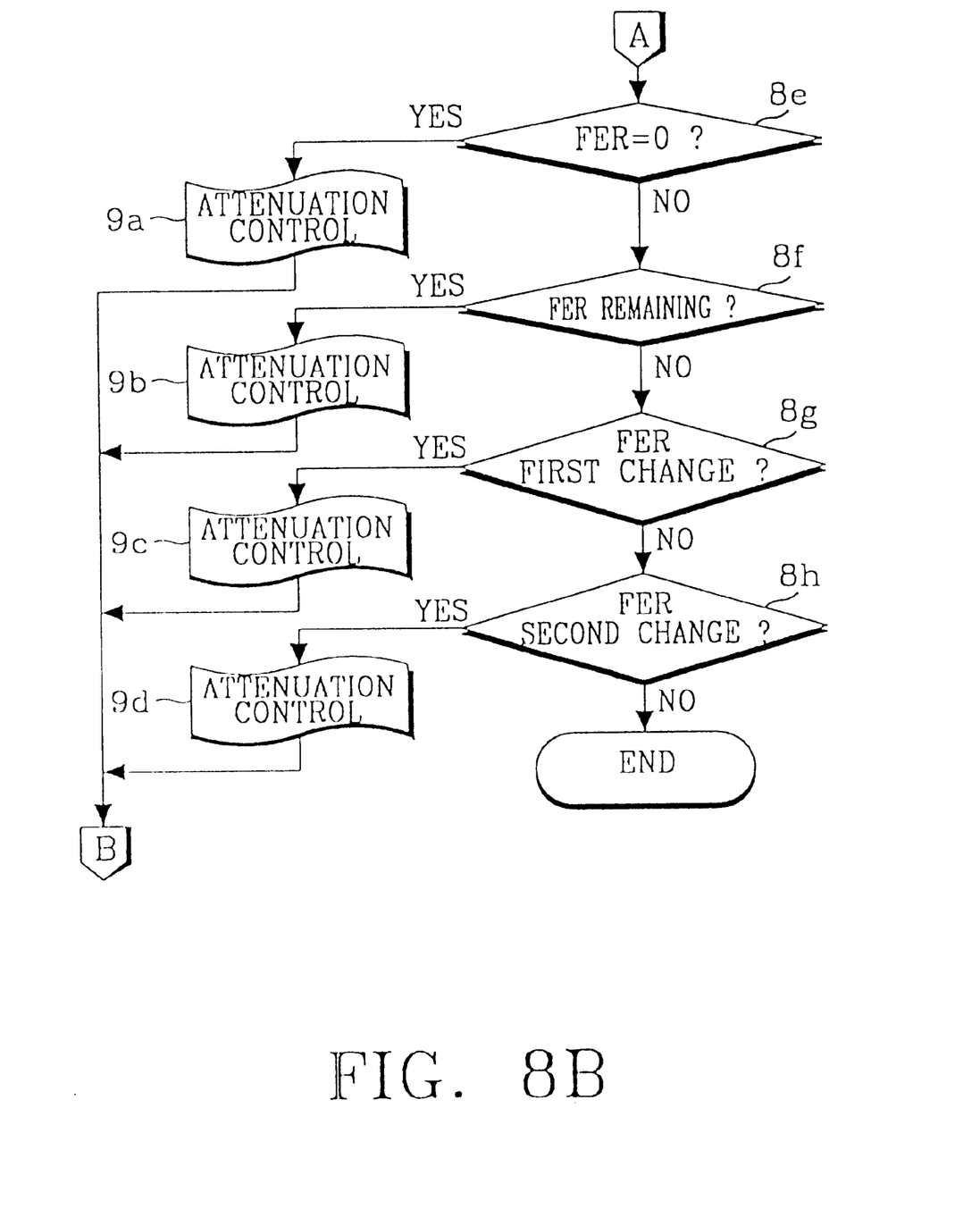

Describing the process for eliminating the external interference signals according to the second embodiment in reference to FIGS. 8A and 8B, in step 8q, the controller 14 sets the damping device control voltage. Detecting a signal received by the antenna 11 in step 8a, it is checked to which one of the RSSI grades-weak, medium and strong-the received signal belongs in steps 8b–8d. If the RSSI grade is weak, the steps of 8i–8l are carried out. If the RSSI grade is medium, the steps of 8e–8h are carried out as shown in FIG. 8B. If the RSSI is strong, it is returned to step 8a for processing the next received signal because it does not need the attenuation control.

The steps 8i–8l are to check to which one of the FER grades the received signal belongs, e. g. zero, remaining, FER first change and second change. In steps 9e–9h, the difference between the original signal and the external interference signals is detected based on the damping device control voltage, RSSI and FER, and the damping control voltage is set by performing the attenuation control according to the difference. Thereafter, it is returned to step 8a for processing the next received signal. The steps 8e–8h and 9a–9d as shown in FIG. 8B are executed in the same way.

If the RSSI is not determined to belong to any one of the three grades, it is checked through the steps of 8m–8p to which one of the FER grades the signal received by the antenna 11 belongs as previously described. The difference between the original signal and the external interference signals is detected based on the damping device control voltage and FER, that the damping control voltage is set by performing the attenuation control according to the difference. Thereafter, it is returned to step 8a for processing the next received signal.

Although the present invention has been described with reference to the specific embodiments together with accompanying drawings, it will be readily appreciated by those skilled in this art that various modifications may be made without departing from the gist of the present invention.

Thus, the inventive CDMA phone eliminates the external interference signals generated from an AMPS station to receive only CDMA signals, so that communication errors are prevented even in the area of the AMPS station.

What is claimed is:

1. An apparatus for minimizing external interference signals in a code division multiple access (CDMA) mobile phone, comprising:

a damping device for adjustably attenuating signals received from an antenna;

a memory for storing information including a plurality of predetermined control voltage values, received signal strength indicator (RSSI) data classified into a plurality grades for each of said control voltage values, reference value data classified into a plurality of grades for each RSSI to meet a given signal receiving condition, and control voltage change data corresponding to said reference value data;

an RSSI detector for detecting the RSSI of a received signal;

a control voltage generator for generating the control voltage to adjust attenuation levels of said damping device; and a controller for evaluating the difference between the signals received and external interference signals by analyzing said control voltage and the detected RSSI based on the information stored in said memory, and for adjusting said control voltage according to said difference.

2. The apparatus as in claim 1, wherein said reference value data is mean transmission energy rate per pseudo noise (PN) chip.

3. An apparatus as in claim 2, further comprising a transmission energy rate detector for detecting said mean transmission energy per PN chip, whereby said controller evaluates the difference between said signals received and external interference signals based on said control voltage, RSSI and mean transmission energy rate per PN chip.

4. The apparatus as in claim 1, wherein said reference value data is frame error rate (FER) data of a received signal.

5. The apparatus as in claim 4, further comprising a frame error rate detector for detecting said FER, whereby said controller evaluates the difference between said signals received and external interference signals based on said control voltage, RSSI and FER.

6. In an apparatus for minimizing external interference signals in a code division multiple access (CDMA) mobile phone with a low noise amplifier connected to a damping device, which includes a memory for storing a plurality of predetermined control voltage values, received signal strength indicator (RSSI) data classified into a plurality grades for each of said control voltage values, reference value data classified into a plurality of grades for each RSSI to meet a given signal receiving condition and control voltage change data corresponding to said reference value data, a method for eliminating said external interference signals comprising the steps of:

(a) setting an initial control voltage to control said damping device;

(b) receiving a communication signal;

(c) finding one of said RSSI data grades where the RSSI of said received signal belongs;

(d) finding one of said reference value data grades where said received signal belongs; and (e) evaluating the difference between the communication signal and said external interference signals based on said control voltage, RSSI grade and reference value data grade, whereby said control voltage generator is controlled to adjust said control voltage according to said difference.

7. The method according to claim 6, further including in step (d), if said RSSI does not belong to one of said RSSI grades, mean transmission energy rate data is used as said reference value data; and said step evaluating the difference is based on said control voltage and said means transmission energy rate grade.

8. The method as in claim 6, including further steps of:

finding one of the grades of frame error rate (FER) data according to a received signal in a forward communication channel if said RSSI does not belong to one of said RSSI grades in step (d), said reference value data being said FER data; and evaluating the difference between the communication signal and said external interference signals based on said control voltage and said FER grade; and adjusting said control voltage according to said difference; and returning to said second step (b).

9. An apparatus for minimizing external interference signals in a code division multiple access (CDMA) mobile phone with a low noise amplifier connected to a damping device, comprising:

a memory for storing signal data representing a plurality of predetermined control voltage values, received signal strength indicator (RSSI) data classified into a plurality of grades for each of said control voltage values, mean transmission energy rate data per pseudo noise (PN) chip classified into a plurality of grades for each RSSI and control voltage change data corresponding to said mean transmission energy rate data;

an RSSI detector for detecting the RSSI of a received signal;

a transmission energy rate detector for detecting said mean transmission energy per PN chip from said detected RSSI;

a control voltage generator for generating the control voltage to control said damping device; and a controller for evaluating the difference between the normal signal and said external interference signals by appraising said control voltage, the detected RSSI and the detected mean transmission energy rate per PN based on the information stored in said memory, thereby making said control voltage generator reset said control voltage according to said difference.

10. An apparatus for minimizing external interference signals in a code division multiple access (CDMA) mobile phone with a low noise amplifier connected to a damping device, comprising:

a memory for storing signal data representing a plurality of predetermined control voltage values, received signal strength indicator (RSSI) data classified into a plurality of grades for each of said control voltage values, frame error rate (FER) data according to a received signal in a forward communication channel classified into a plurality of grades for each RSSI and control voltage change data corresponding to said FER data;

an RSSI detector for detecting the RSSI of a received signal;

a frame error rate detector for detecting said FER;

a control voltage generator for generating the control voltage to control said damping device; and a controller for evaluating the difference between the received signal and said external interference signals by processing said control voltage, the detected RSSI and the detected FER based on the signal data stored in said memory, thereby making said control voltage generator reset said control voltage according to said difference.

* * * * *